United States Patent [19]

Kakizaki et al.

[11] 3,721,752

[45] March 20, 1973

[54] IMAGE PICKUP TUBE

[75] Inventors: Takehiro Kakizaki, Hodogaya-ku, Yokohama-shi, Kanagawa-ken; Yasuharu Kubota, Fujisawa-shi, Kanagawa-ken, both of Japan

[73] Assignee: Sony Corporation, Tokyo, Japan

[22] Filed: Dec. 21, 1971

[21] Appl. No.: 210,425

[30] Foreign Application Priority Data

Dec. 24, 1970 Japan..........................45/140392

[52] U.S. Cl.............................178/5.4 ST, 178/5.4 F

[51] Int. Cl...............................................H04n 9/06

[58] Field of Search.......................178/5.4 ST, 5.4 F

[56] References Cited

UNITED STATES PATENTS 3,575,548 4/1971 Kurokawa.......................178/5.4 ST

*Primary Examiner*—Richard Murray
*Attorney*—Lewis H. Eslinger et al.

[57] ABSTRACT

In an image pickup tube for a color television camera having a photoconductive layer for the conversion of images projected thereon into an electrical output and onto which a color separated image of an object to be reproduced is projected through a color filter which is part of the tube or separate therefrom and a pair of indexing electrodes disposed in close proximity to the photoconductive layer to electrically produce an index image on such layer in response to the application of different voltages to the indexing electrodes; two photovoltaic cells are included in the image pickup tube and electrically connected in parallel with each other between the indexing electrodes with their polarities reversed, and the photovoltaic cells are alternately activated by radiant energy originating outside the tube to provide the different voltages for producing the index image so that the electrical output is a composite signal containing a color video signal corresponding to the color separated image and a balanced index signal corresponding to the index image and by which individual color component signals may be separated from the color video signal. The electrical output is preferably derived at a junction between a pair of series-connected resistors also connected between the indexing electrodes; and a biasing voltage is also applied to the indexing electrodes by way of that junction.

14 Claims, 21 Drawing Figures

INVENTORS
TAKEHIRO KAKIZAKI
YASUHARU KUBOTA

INVENTORS
TAKEHIRO KAKIZAKI
YASUHARU KUBOTA

INVENTORS
TAKEHIRO KAKIZAKI
YASUHARU KUBOTA

INVENTORS
TAKEHIRO KAKIZAKI
YASUHARU KUBOTA
BY

ATTORNEY

INVENTORS
TAKEHIRO KAKIZAKI
YASUHARU KUBOTA

INVENTORS
TAKEHIRO KAKIZAKI
YASUHARU KUBOTA

IMAGE PICKUP TUBE

This invention relates generally to a device for producing a color video signal by the employment of a single image pickup tube, and more particularly is directed to improvements in an image pickup tube for a television camera capable of producing color signals and which is of the type disclosed in U.S. Pat. application Ser. No. 176,553 filed Aug. 31, 1971, by Yasuharu Kubota, one of the joint applicants herein, and which has a common assignee with the present application.

A color television camera of the described type comprises a single image pickup tube having a photoconductive layer on which a color separated image of an object to be reproduced is projected, and indexing electrodes disposed in close proximity to the photoconductive layer to electrically produce an index image on that layer in response to the application of different voltages to the indexing electrodes, so that the electrical output from the photoconductive layer is a composite signal containing a color video signal corresponding to the color separated image and an index signal corresponding to the index image and by which individual color component signals may be separated from the color video signal. In U.S. Pat. application Ser. No. 176,553, identified more fully above, the different voltages are applied to the indexing electrodes by means of photoelectric transducing means, for example, photovoltaic cells, included in the image pickup tube and electrically connected in series between the indexing electrodes with the polarities of the photovoltaic cells being reversed or opposed to each other, and such photovoltaic cells are alternately activated, from outside the tube, by suitable devices emitting radiant energy, for example, by luminescent diodes emitting invisible rays, such as infrared rays, to which the photoconductive layer is insensitive. However, with the foregoing arrangement for applying the different voltages to the indexing electrodes, the series connection of the photovoltaic cells between the indexing electrodes results in the reverse biasing of one of the cells when the other photovoltaic cell is activated. Such reverse biasing of the inactive photovoltaic cell is disadvantageous in the following respects: Firstly, by reason of the reverse biasing of the inactive cell, the voltage difference between one of the indexing electrodes and a junction at which a bias voltage is applied is not equal to the voltage difference between the other indexing electrode and that junction, whereby an unbalanced index signal results and may appear as a leakage signal in the chrominance signal included in the color video signal to cause deterioration of the reproduced picture; and, secondly, the reverse biasing of each photovoltaic cell, when inactive, causes a delay in the generation of a voltage by that cell when the latter is subsequently activated by the impingement of radiant energy thereon, so that the index signal will not have the desired waveform for most effective separation of the individual color component signals from the color video signal.

Accordingly, it is an object of the invention to provide an image pickup tube, as aforesaid, in which the described problems are eliminated.

More particularly, it is an object of this invention to provide an image pickup tube, as aforesaid, in which the different voltages are applied to the indexing electrodes by means of alternately activated photovoltaic cells which are arranged to avoid reverse biasing of the cell which is inactive at any time, and thereby to avoid the above described disadvantages of such reverse biasing.

In accordance with an aspect of the invention, the photovoltaic cells are connected in parallel with each other and in parallel with a pair of series-connected resistors between the indexing electrodes, and the electrical output is derived at a junction between the resistors at which the bias voltage may also be applied, so that, at all times, the voltage or potential at the junction is midway between the respective potentials of the indexing potentials to provide a balanced index signal. Further, since the inactive photovoltaic cell is forwardly biased by the voltage generated by the active cell, the previously inactive cell will become immediately active when radiant energy impinges thereon.

The above, and other objects, features and advantages of this invention, will be apparent in the following detailed description of an illustrative embodiment which is to be read in connection with the accompanying drawings, wherein.

Figure 6:
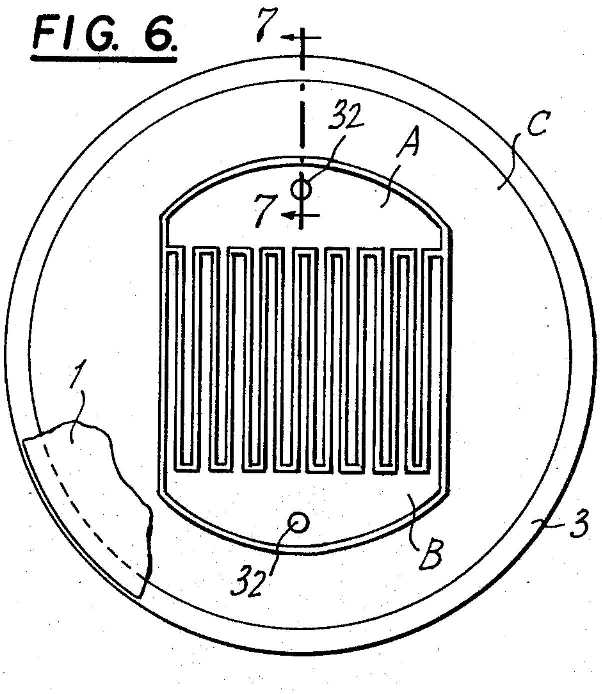
FIG. 6 is a plan view showing the arrangement of the indexing electrodes on the face plate assembly of one image pickup tube that has been proposed for use in the camera of FIGS. 1 and 2, and in which the photoconductive layer is shown partly broken away to expose the indexing electrodes.
Figure 7:
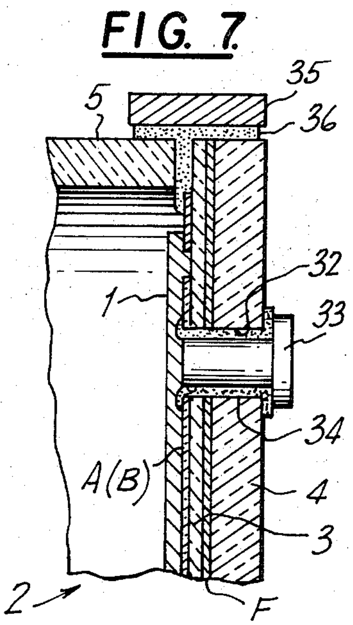
FIG. 7 is an enlarged, fragmentary sectional view taken along the line 7—7 of FIG. 6, and showing the structure by which each of the indexing electrodes of the previously proposed image pickup tube is connected to the associated electric circuit.
Figures 8, 9:
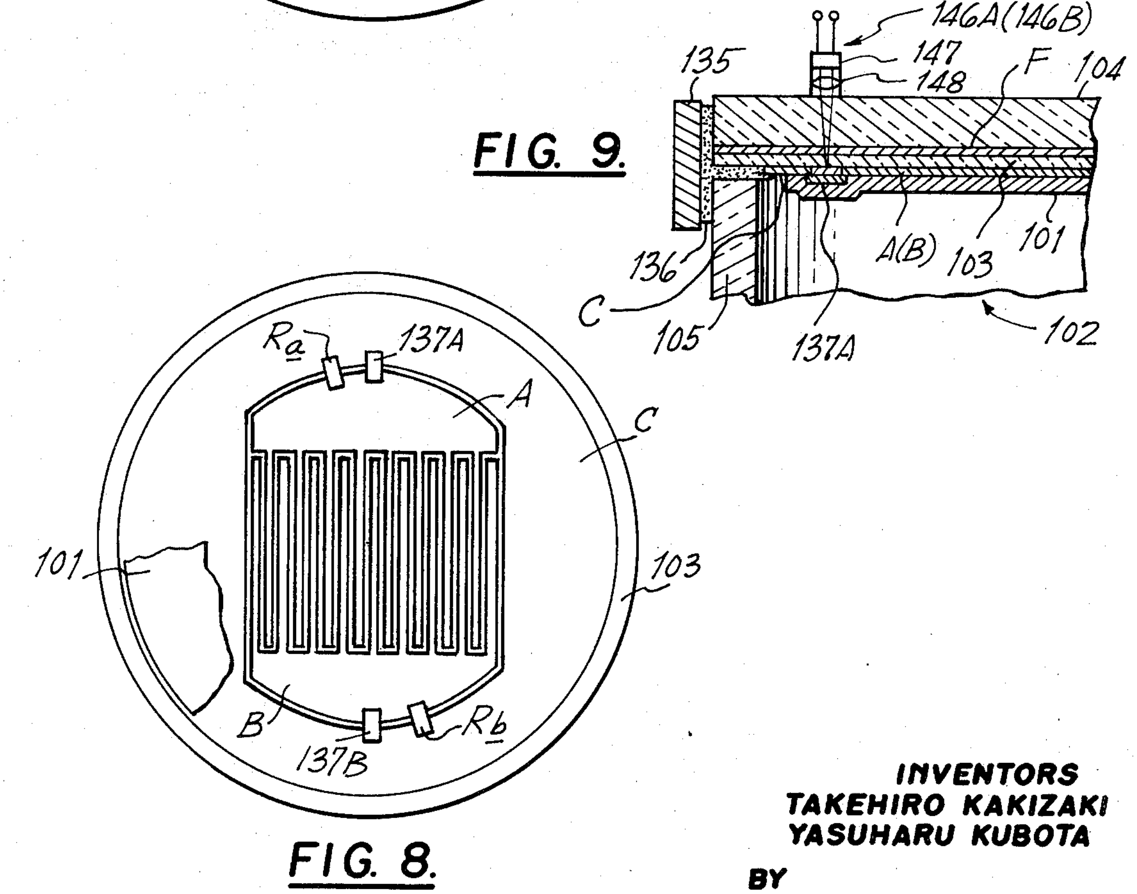
Figure 10:
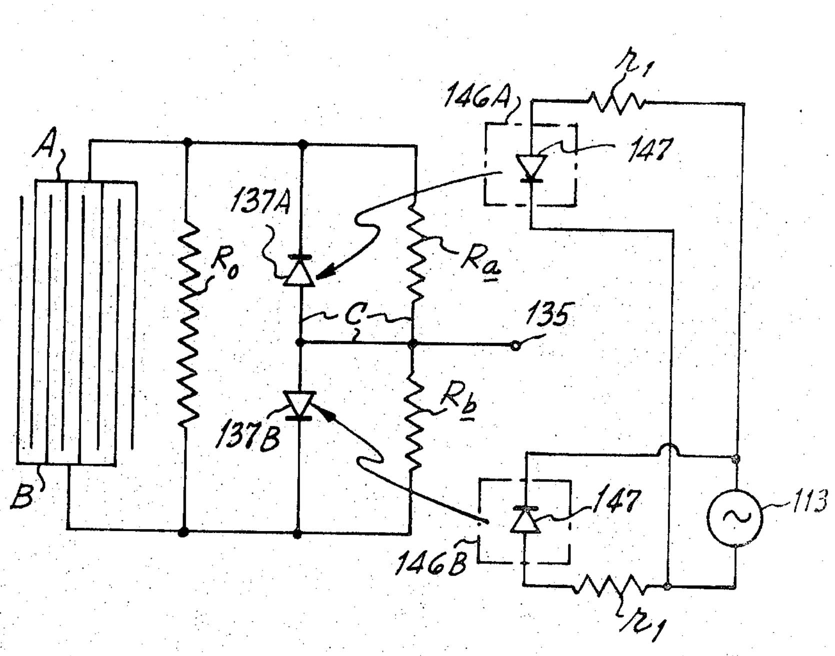
Figure 13:
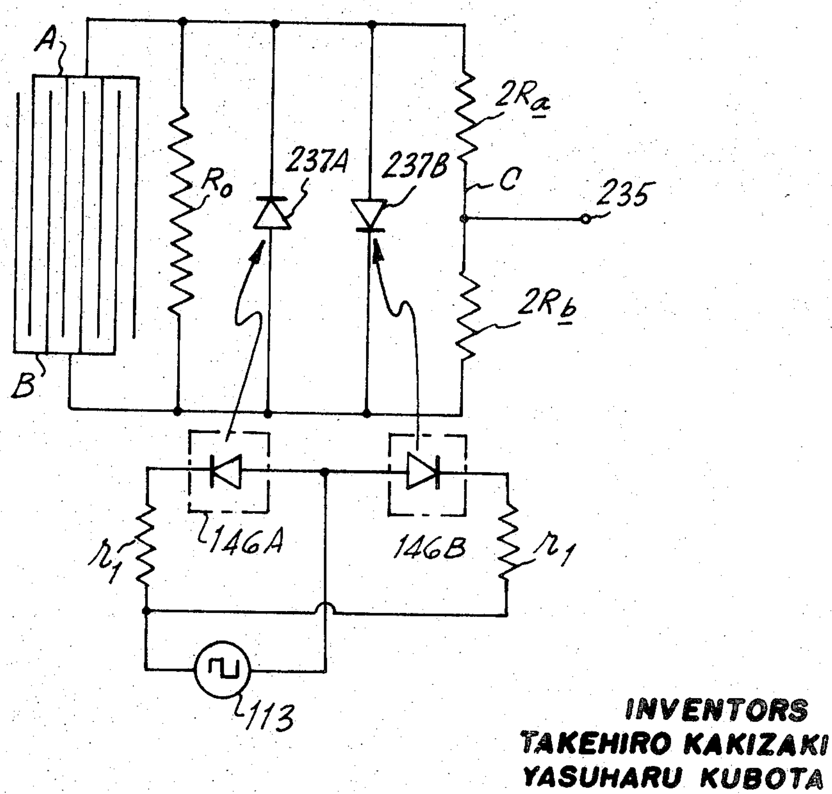
Figure 12:
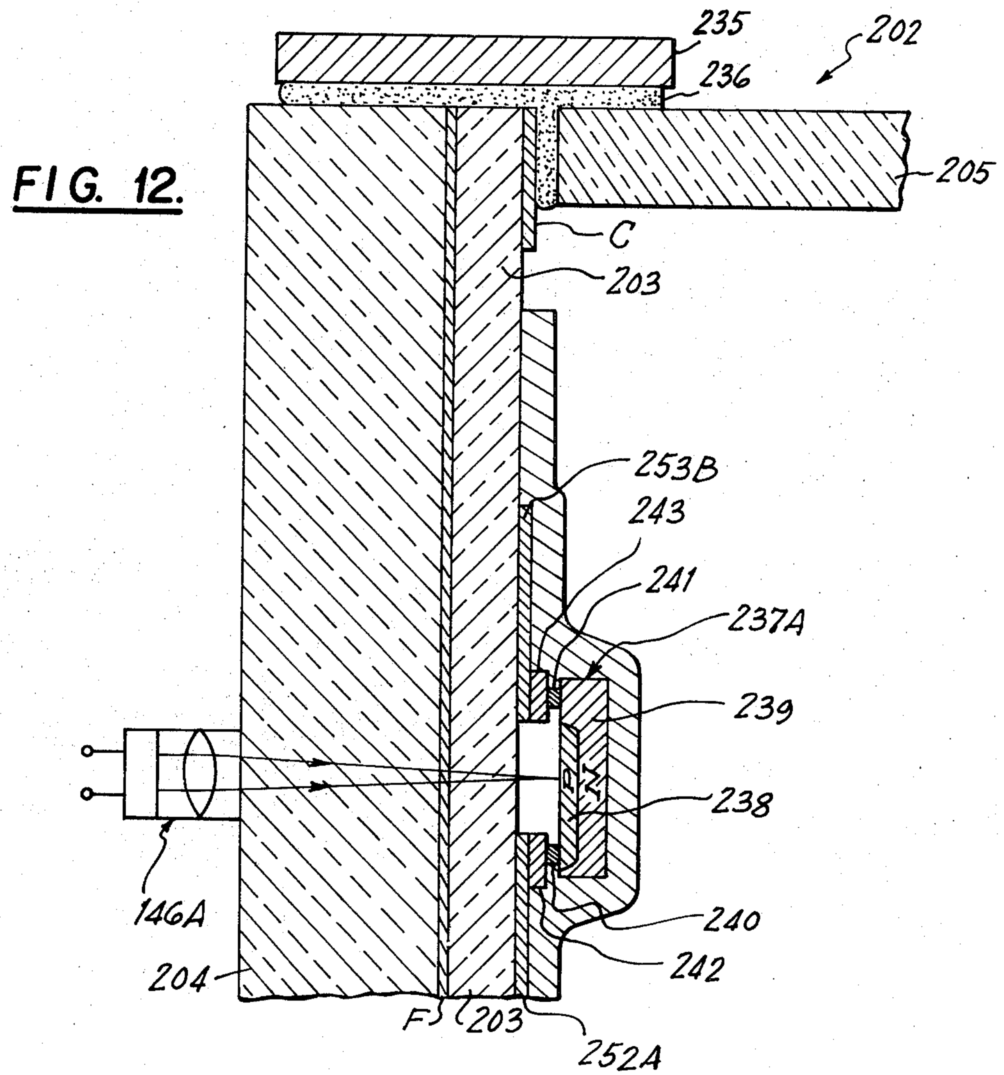
Figure 11:
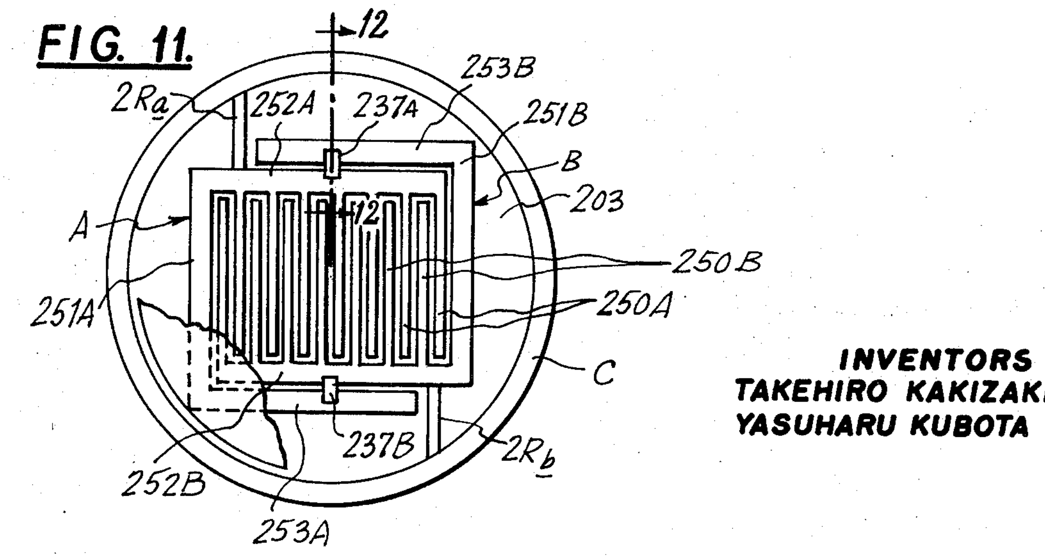

FIG. 8 and 9 are views similar to FIGS. 6 and 7, respectively, but showing an image pickup tube that has been previously proposed for avoiding disadvantages inherent in the arrangement of FIGS. 6 and 7;

FIG. 10 is a circuit diagram showing the electrical circuit equivalents of the arrangement illustrated in FIGS. 8 and 9;

FIG. 11 is a view similar to that of FIG. 6, but showing the arrangement of the indexing electrodes and photovoltaic cells and associated circuit elements in an image pickup tube according to this invention;

FIG. 12 is an enlarged, fragmentary sectional view taken along the line 12—12 on FIG. 11, and showing details of one of the photovoltaic cells used in the arrangement of FIG. 11; and FIG. 13 is a view similar to that of FIG. 10, but showing the electrical circuit equivalents of the arrangement according to this invention.

In order to provide a suitable background for explanation of this invention, a color television camera of a type to which the present invention may be advantageously applied will be described with reference to FIGS. 1 and 2, and it should be noted that a more detailed description of such camera will be found in U.S. Pat. application Ser. No. 72,593, filed Sept. 16, 1970 by Yosuharu Kubota, one of the joint inventors herein, and having a common assignee herewith.

The mentioned color television camera is shown to include an image pickup tube 2 having a pair of index electrodes A (composed of elongated strip elements $A_2$, $A_2$, . . . $A_i$, . . . $A_n$) and B (composed of elongated strip elements $B_1$, $B_2$ . . . $B_i$ . . . $B_n$) disposed adjacent a photoconductive layer 1 of pickup tube 2. The photoconductive layer 1 is formed, for example, of materials such as antimony trisulfide, lead oxide and the like. The electrodes A and B are transparent conductive layers formed of tin oxide including antimony, and they are arranged with their elements alternated, for example, in an order which may be $A_1$, $B_1$, $A_2$, $B_2$, . . . $A_i$, $B_i$, . . . $A_n$, $B_n$. The electrodes A and B are shown respectively connected to terminals $T_A$ and $T_B$ for connection with external circuits. In this case, the electrodes A and B are disposed so that the longitudinal axes of their elongated strip elements may cross the horizontal scanning direction of an electron beam.

The electrodes A and B are disposed on one side of a glass plate 3, on the other side of which there is an optical filter F made up of red, green and blue color filter elements $F_R$, $F_G$ and $F_B$ arranged in a repeating cyclic order of $F_R$, $F_G$, $F_B$, $F_R$, $F_G$, $R_B$ . . . and disposed parallel to the length of the elements of electrodes A and B in such a manner that each triad of red, green and blue color filter elements $F_R$, $F_G$ and $F_B$ may be opposite to each pair of adjacent electrode elements $A_i$ and $B_i$. So long as the elements of electrodes A and B and of optical filter F are aligned with each other in their longitudinal directions, their relative arrangement is optional. The optical filter F is shown covered by a faceplate 4 mounted at one end of the tube envelope 5 so that the photoconductive layer 1, the electrodes A and B, the glass plate 3 and the optical filter F are enclosed in the tube envelope 5. A deflection coil 6, a focusing coil 7 and an alignment coil 8 are mounted about the image pickup tube 2, and an image lens is provided for focusing the image of an object 10 to be televised onto the photoconductive layer 1 through the faceplate 4. An electron gun 11 is shown within tube envelope 5 for emitting the electron beam which is made to scan the layer 1 by the deflection coil 6.

Figure 1:
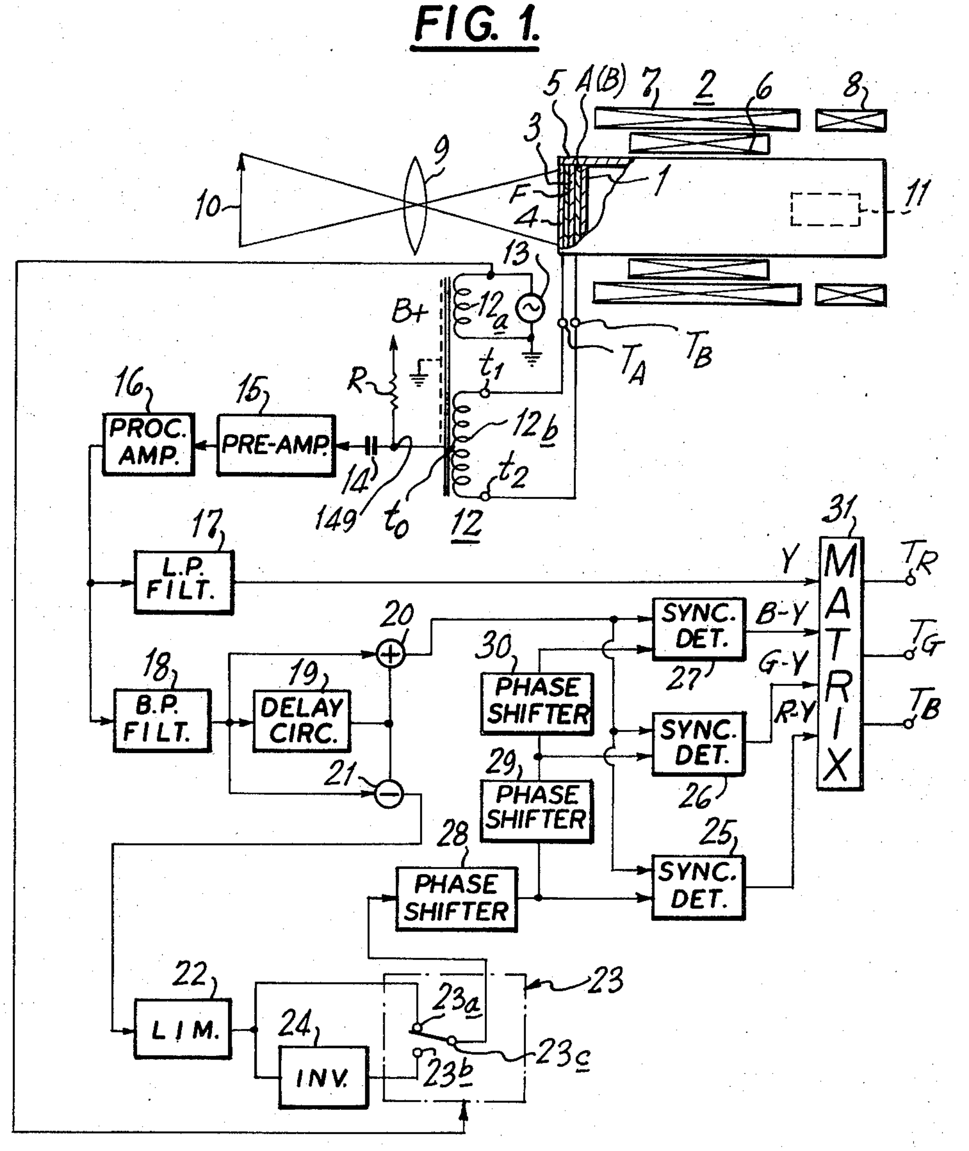
FIG. 1 is a system diagram illustrating a color television camera of a type in which an image pickup tube in accordance with the present invention may be employed.
Figure 3:
FIGS. 3 and 4 are waveform diagrams, for explaining the operation of the camera shown on FIGS. 1 and 2.

In the previously proposed camera of FIG. 1, the external circuits for association with the image pickup tube 2 include a transfer 12 which consists of a primary winding **12*a* and a secondary winding 12*b* having a mid tap $t_o$. The end terminals $t_1$ and $t_2$ of the secondary winding 12*b* are respectively connected to terminals $T_A$ and $T_B$ of the image pickup tube 2. The primary winding 12*a* is connected to a signal source 13 which produces an alternating signal $S_1$ (FIG. 3) that is synchronized with the line scanning period of the image pickup tube 2. This alternating signal $S_1$ has a rectangular waveform with a pulse width equal to a horizontal scanning period H of the electron beam, for example, a pulse width of 63.5 microseconds and a frequency which is one-half of the horizontal scanning frequency, namely, 15.75/2 KHz. The mid tap $t_o$ of secondary winding 12*b* is connected to the input of a preamplifier 15 through a capacitor 14** and is supplied with a DC bias voltage of 10 to 50V from a proper source B+ through a resistor R.

Figure 5:
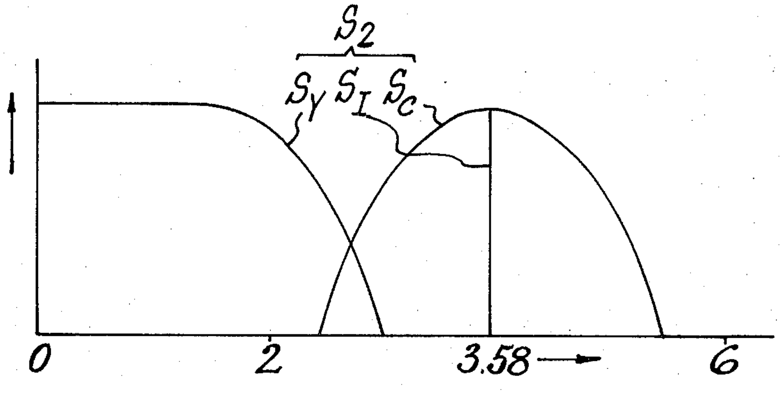
FIG. 5 is a graph showing one example of a frequency spectrum for a color video signal produced by the color television camera of FIGS. 1 and 2.
Figures 4A, 4B, 4C, 4D, 4E, 4F:
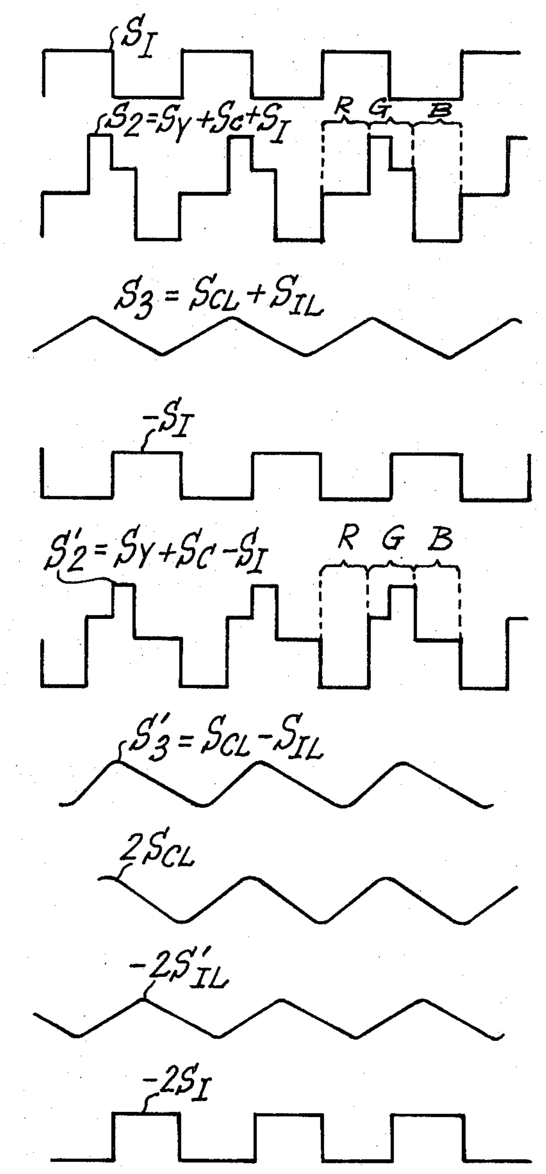

With such an arrangement, the electrodes A and B are alternately supplied with voltages higher and lower than the DC bias voltage for every horizontal scanning period, so that a stripped potential pattern corresponding to the electrodes A and B is formed on the surface of the photoconductive layer 1. Accordingly, when the image pickup tube 2 is not exposed to light, electron beam scanning of layer 1 results in a signal $S_I$ corresponding to the rectangular waveform illustrated in FIG. 4A being derived, in a scanning period $H_1$, at the mid tap $t_o$ of the secondary winding **12*b*. When a DC bias voltage, for example, 30V, is supplied to the mid tap $t_o$ of the secondary winding 12*b* and an alternating voltage of 0.5V is impressed between the terminals T and T , the current flowing across the resistor R varies by 0.05 microamperes and can be used as an index signal. The frequency of this index signal $S_I$ is optionally determined with reference to the width and interval of the elements of electrodes A and B and one horizontal scanning period of the electron beam, and can for example be 3.58 MHz. When a color separated image of the object 10 is focused on the photoconductive layer 1 by means of lens 9 and filter F, signals corresponding to the light intensity of the filtered red, green and blue components are produced in overlapping relation with the index signal $S_I$ in response to the beam scanning of layer 1 to produce a composite signal $S_2$ such as is illustrated in FIG. 4B, in which the reference characters R,G and B respectively designate portions of the composite signal $S_2$ corresponding to the red, green and blue color components. The composite signal $S_2$ is the sum of the luminance signal $S_Y$, the chrominance signal $S_C$ and the index signal $S_I$, namely $S_2=S_Y+S_C+S_I$. The frequency spectrum of the composite signal $S_2$, as illustrated in FIG. 5, is determined by the width of the elements of electrodes A and B and of the optical filter F, and by the horizontal scanning period. That is, the composite signal $S_2$, in its entirety, is in a bandwidth of 6 MHz and the luminance and chrominance signals $S_Y$ and $S_C$ are respectively arranged in the lower and higher bands of that bandwidth. It is preferred to minimize overlapping of the luminance and chrominance signals $S_Y$ and $S_C$ and, if desired, it is possible to dispose a lenticular lens or the like in front of the image pickup tube 2**. This optically lowers resolution and narrows the luminance signal band.

In the next horizontal scanning period $H_{i+1}$ the voltage (the alternating signal) applied to the electrodes A and B is reversed in phase, in which case an index signal $-S_I$ is produced, as depicted in FIG. 4A', which is opposite in phase to the index signal $S_I$ shown in FIG. 4A. Accordingly, a composite signal $S_2'$ is then supplied to the input side of the preamplifier 15, as shown in FIG. 4B', namely $S_2'=S_Y+S_C-S_I$.

Such a composite signal $S_2$ (or $S_2'$) is supplied through the preamplifier 15 to the process amplifier 16 for waveform shaping and/or gamma correction. Thereafter, the signal is applied to a low-pass filter 17 and a bandpass filter 18. As a result, the luminance signal $S_Y$ and a signal $S_3=S_{CL}+S_{IL}$ (FIG. 4C), or a signal $S_3'=S_{CL}-S_{IL}$ (FIG. 4C') are respectively derived from the low-pass filter 17 and the bandpass filter 18. In the foregoing equations for $S_3$ and $S_3'$, $S_{CL}$ and $S_{IL}$ are low frequency components or fundamental components of the chrominance signal $S_L$ and the index signal $S_I$, respectively.

Since the repetitive frequencies of the index signals $S_I$ and the chrominance signal $S_C$ are equal to each other, the separation of these signals is achieved in the following manner without using a filter.

Reference numeral 19 indicates a delay circuit, for example, an ultrasonic delay line, by means of which the signal $S_3=S_{CL}+S_{IL}$ (or $S_3'=S_{CL}-S_{IL}$) derived from the bandpass filter 18 is delayed by one horizontal scanning period 1H. The signals $S_3=S_{CL}+S_{IL}$ (or $S_3'=S_{CL}-S_{IL}$) in a certain horizontal scanning period $H_i$ and the signal $S_3'=S_{CL}-S_{IL}$ (or $S_3=S_{CL}+S_{IL}$) in the subsequent horizontal scanning period $H_{i+1}$, which are derived from the delay circuit 19 and the bandpass filter 18 are supplied to an adder circuit 20 to be added together, providing as an output a chrominance signal $2S_{CL}$ such as is depicted in FIG. 4D. In this case, the contents of chrominance signals in adjacent horizontal scanning periods are so similar that they can be regarded as substantially the same. Further, it is also possible to delay the signal from the bandpass filter 18 by three or five horizontal scanning periods due to their similarity.

These signals $S_3=S_{CL}+S_{IL}$ (or $S_3'=S_{CL}-S_{IL}$) and $S_3'=S_{CL}-S_{IL}$ (or $S_3=S_{CL}+S_{IL}$) in the horizontal scanning periods $H_i$ and $H_{i+1}$ are also applied to a subtraction circuit 21 to achieve a subtraction $(S_{CL}-S_{IL})-(S_{CL}+S_{IL})$ [or $(S_{CL}+S_{IL})-(S_{CL}-S_{IL})$] to derive therefrom an index signal $-2S'_{IL}$ (FIG. 4E) or $2S'_{IL}$ (not shown). The resulting index signal $-2S'_{IL}$, or $2S'_{IL}$, is fed to a limiter circuit 22 to render its amplitude uniform, and thereby forming an index signal $-2S_I$ (or $2S_I$) as depicted in FIG. 4F.

The index signal $-2S_I$ (or $2S_I$) thus obtained is reversed in phase at every horizontal scanning period, so that the signal $-2S_I$ is corrected in phase through the use of a change-over switch 23 (an electronic switch in practice) having fixed contacts 23*a* and 23*b* and a movable contact 23*c*. The output side of the limiter 22 is directly connected to one fixed contact 23*a* of the change-over switch 23 and to the other fixed contact 23*b* through an inverter 24. The change-over switch 23 is constructed so that its movable contact 23*c* makes contact with the fixed contacts 23*a* and 23*b* alternately for every horizontal scanning period in synchronism with the alternating signal $S_I$ impressed on the primary winding 12*a* of the transformer 12 to thereby derive the index signal $2S_I$ from the movable contact 23*c* at all times.

The chrominance signal $S_{CL}$ derived from the adder circuit 20 is supplied to synchronous detectors 25,26 and 27. The index signal $S_{IL}$ is supplied to the synchronous detector 25 through a phase shifter 28 which adjusts the phase of the index signal to that of the red signal in order to produce a color difference signal R−Y at the output of the detector 25. In a similar manner the output signal from the phase shifter 28 is supplied to the synchronous detector 26 through a phase shifter 29 to produce a color difference signal G−Y at the output of the detector 26 and the output signal from the phase shifter 29 is supplied to the synchronous detector 27 through a phase shifter 30 to produce a color difference signal B−Y at the output of the detector 27. The phase shifters 29 and 30 each change the phase of the input thereto by 120°. These color difference signals and the luminance signal $S_Y$ are applied to a matrix circuit 31 to derive color signals $S_R$, $S_G$ and $S_B$ at its terminals $T_R$ , $T_G$ and $T_B$, respectively. The color signals thus obtained may be suitably processed to produce color television signals for the NTSC system and other various systems.

The formation of the color separated images on the photoconductive layer 1 of pickup tube 2 may be accomplished by any conventional method. For example, as shown, the image of the object to be televised may be focused by objective lens 9 onto the photoconductive layer 1 through a color filger F disposed inside of the pickup tube in close proximity to the photoconductive layer 1. Alternatively, a lens screen (not shown) consisting of many lenticular lenses can be disposed on the outer surface of the face plate 4 of the pickup tube and the image of a color filter consisting of a plurality of pairs of striped color filter elements, and being interposed between an object to be televised and such lens screen, may be projected by the lens screen onto the photoconductive layer in overlapping relation to the image of the object being televised.

Figure 2:
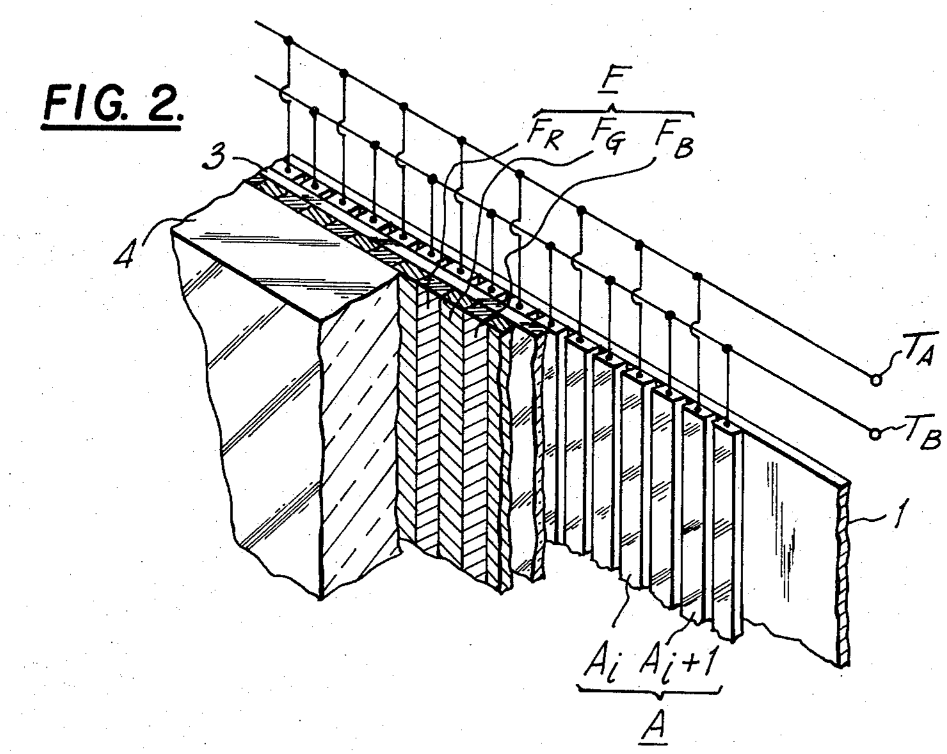
FIG. 2 is a perspective view, partly in cross-section, schematically showing the principal parts of a pickup tube employed in the color television camera illustrated in FIG. 1.

Referring now to FIGS. 6 and 7, it will be seen that, in one proposed construction of the image pickup tube 2 for use in the color television camera system of FIGS. 1 and 2, a transparent conductive layer, for example, of tin oxide, is deposited on the entire area of one surface of the thin glass plate 3 and is then subjected to photoetching to remove selected portions of that conductive layer so that the remaining portions of the latter form two interleaved, comb-shaped indexing electrodes A and B and a surrounding electrode C (FIG. 6). The surface of plate 3 facing away from electrodes A,B and C thereon is bonded, as by adhesive, to the glass face plate 4 which has the striped color filter F formed thereon. Holes 32 (FIG. 6) are bored through plates 3 and 4 at locations within the spines or bus-bar portions of electrodes A and B and each receive a conductive post 33 (FIG. 7), for example, of copper, which is sealed in the respective hole 32 by an indium bushing 34 which is also intended to establish electrical contact between the post 33 and the respective indexing electrode A or B. The photoconductive layer 1 is then applied over the entire surface of plate 3 having the electrodes A,B and C thereon.

The face plate assembly, constructed as above, is then secured on the front end of the tube envelope 5 by means of a conductive ring 35 and an intervening seal 36 of indium which extends onto the electrode C for electrically connecting the latter with conductive ring 35. Since the resistance of photoconductive layer 1 is very high, that layer 1 can extend onto electrode C, as shown, without disturbing the operation of the image pickup tube.

In employing the image pickup tube having the construction described above with reference to FIGS. 6 and 7 in the color television camera system of FIG. 1, the posts 33 associated with electrodes A and B are respectively connected to terminals $T_A$ and $T_B$ on FIG.

1. Further, if desired, electrode C may be grounded, or supplied with a bias potential equal to that applied to electrodes A and B, by way of the conductive ring 35 so as to prevent the storage of any unwanted charge on the faceplate assembly as a result of the impingement of the electron beam thereon. Of course, the mentioned unwanted change also tends to be discharged from the electrode C to the electrodes A and B when the photoconductive layer 1 extends onto the electrode C, as shown.

The construction of the image pick tube described with reference to FIGS. 6 and 7 gives rise to manufacturing problems, particularly as to the provision of the conduction posts 33 extending through the face plate for connecting the electrodes A and B to the circuits shown on FIG. 1. Such posts 33 complicate the structure and manufacture of the tube. Further, although the face plate assembly, as a unit, can be effectively sealed at the front end of the tube envelope 5 by means of the ring 35 and indium seal 36 through the use of existing techniques, difficult is experienced in achieving the reliable hermetic sealing of the posts 33 in the face plate assembly.

It has been heretofore proposed, for example, as shown on FIGS. 8,9 and 10, and as disclosed in detail in U.S. Pat. application Ser. No. 176,553 which is more fully identified above, to eliminate the conductive posts 33 extending through to face plate, whereby to eliminate the attendant problems, and to apply different voltages to the indexing electrodes A and B through photoelectric transducers which are made part of the face plate assembly without interrupting the integrity of the latter, that is, without forming holes in the face plate assembly. For example, as shown on FIGS. 8 and 9, it has been proposed to provide an image pickup tube 102 which has a face plate assembly which is similar to that of the previously described tube 2 and includes a glass face plate 104 with a striped color filter F thereon bonded to a thin glass plate 103 on which the indexing electrodes A and B and a surrounding electrode C are formed, as before. The illustrated face plate assembly is further shown to be mounted, in a sealed manner, at the front end of the tube envelope 105 by means of a conductive ring 135 and an indium seal 136 which electrically connects ring 135 with electrode C. The face plate assembly of tube 102 is further shown to include photovoltaic cells 137A and 137B which extend between electrodes A and C and between electrodes B and C, respectively. As before, the photoconductive layer 101 is applied over electrodes A,B and C and may cover the photoelectric transistors 137A and 137B, as shown.

The photovoltaic cells 137A and 137B have selectively energizable radiant energy sources 146A and 146B respectively associated therewith at the front of face plate 104 to emit light rays which pass through face plate 104 and activate the respective transducers 137A and 137B at the back thereof. The radiant energy or light sources 146A and 146B are shown, with respect to source 146A, to each constitute a luminescent diode 147 and a lens 148 for focusing the emitted light on the respective transducer 137A or 137B. If the luminescent diodes 147 are in the form of GaAs (Gallium-Arsenic) diodes which emit infrared rays to which the photoconductive layer 101 is insensitive, no shielding is required to prevent exposure of layer 101 to the light from diodes 147.

Referring now to FIG. 10, it will be seen that, in the equivalent electrical circuit of the described image pickup tube 102, $R_o$ indicates a high resistance between the indexing electrodes A and B as a result of the photoconductive layer 101, and $R_a$ and $R_b$ are discharge resistors, for example, constituted by stripes of a resistive paint, bridging the electrodes A and C and the electrodes B and C (FIG. 8), and serving to discharge the charge due to the capacity formed between the electrodes A and B.

In employing the tube 102 in the system of FIG. 1, the transfer 12 is omitted and the conductive ring 135 is connected to the junction point 149 between resistor R and capacitor 14. Further, the signal source 13 of FIG. 1 is replaced by a similar alternating signal source 113 (FIG. 10) synchronized with the line scanning period of the electron beam and connected with the luminescent diodes 147 of light sources 146A and 146B through protection resistors $r_1$ which limit the current through diodes 147.

With the circuit shown on FIG. 10, the connection of conductive ring 135 to junction point 149 applies the bias voltage B+ to indexing electrodes A and B through electrode C which also functions as an output electrode. The alternating signal from source 113 alternately energizes the luminescent diodes 147 of light sources 146A and 146B, and the resulting light emitted from the latter passes through faceplate 104 and alternately activates the associated photovoltaic cells 137A and 137B. Thus, the voltages applied to electrodes A and B are alternately deviated from the bias voltage for every horizontal scanning period, so that a striped potential pattern or index image corresponding to the interleaved comb-shaped electrodes A and B is formed on the surface of the photoconductive layer 101 and the complete output signal from the tube includes a corresponding index signal which is reversed in phase for successive scanning periods, as previously described with reference to FIGS. 1–4. The composite output signal is derived at conductive ring from electrode C and is applied to junction point 149 on FIG. 1 for FIG. 1 for feeding to preamplifier 15, whereupon the circuit of FIG. 1 operates thereon in the manner previously described.

As is apparent from FIG. 10, in the previously proposed circuit arrangement, the photovoltaic cells 137A and 137B are connected in series between indexing electrodes A and B. Thus, when one of the photovoltaic cells is activated, for example, the cell 137A, the voltage produced by the activated photovoltaic cell 137A causes reverse biasing of the other cell 137B which is not activated. Thus, in the given example, the potential of indexing electrode A will be raised by the voltage $\alpha$ produced by cell 137A above the bias voltage, while the potential of indexing electrode B will be only approximately equal to the bias voltage by reason of the reverse biasing of cell 137B. Conversely, when photovoltaic cell 137B is activated in the next half-cycle of the source 113, the potential of indexing electrode B will be raised by the voltage $\alpha$ produced by cell 137B above the bias voltage, while the reverse biasing of inactive cell 137A will cause the potential of indexing electrode A to be only approximately equal to the bias voltage. As a result of the foregoing, in each half-cycle of the source 113, the voltage difference between the indexing electrode A and ring 135 is not equal to the voltage difference between ring 135 and indexing electrode B so that the index signal included in the electrical output supplied to junction 149 is an unbalanced signal. The unbalanced index signal cannot be cancelled by the adder circuit 20 on FIG. 1 and appears as a leakage signal in the chrominance signal supplied to synchronous detectors 25,26 and 27 with resulting deterioration of the picture image that may be reproduced from the camera output. Further, by reason of the reverse biasing of photovoltaic cell 137B when cell 137A is activated, and of cell 137A when cell 137B is activated, each cell which has been reversely biased carries a stored change and does not immediately produce the desired voltage when radiant energy from the related source 146A or 146B first impinges thereon. Thus, the voltage differences between indexing electrodes A and B and the resulting index signal are not produced in the desired accurate synchronism with the signal from source 113.

The above disadvantages of the heretofore proposed arrangement are eliminated according to this invention by providing a circuit arrangement for applying different voltages to indexing electrodes A and B, for example, as shown on FIG. 13, in which a pair of photovoltaic cells 237A and 237B are connected in parallel with each other, and with their polarities reversed or opposed, between the indexing electrodes. Further, a pair of series-connected resistors $2R_a$ and $2R_b$ are connected between indexing electrodes A and B, that is, in parallel with photovoltaic cells 237A and 237B, and the bias voltage for the indexing electrodes is applied to the junction between resistors $2R_a$ and $2R_b$, for example, at 235, where the electrical output is also derived. As in the previously proposed arrangement of FIGS. 8, 9 and 10, the photovoltaic cells 237A and 237B are alternately activated by the associated radiant energy or light sources 146A and 146B, respectively, which are energized by the alternating signal source 113 through protection resistors $r_1$. Further, as before, the circuit of FIG. 13 is connected at 235 to the junction 149 on FIG. 1.

With the arrangement according to this invention shown on FIG. 13, activation of photovoltaic cell 237A to produce a voltage $\alpha$ causes the potential of indexing electrode A to be $1/2\alpha$ greater than the bias voltage applied, at 235, to the junction between resistors $2R_a$ and $2R_b$ while the potential of indexing electrode B is made to be $1/2\alpha$ less than the bias voltage. Conversely, during activation of photovoltaic cell 237B, the potentials of indexing electrodes A and B are respectively $1/2\alpha$ less than, and greater than the bias voltage. Thus, the index signal included in the electrical output derived at 235 is a balance index signal to avoid the previously described problems that result from the unbalanced index signal produced by the circuit arrangement of FIG. 10. Further, it will be apparent that, when either of the photovoltaic cells 237A and 237B is activated, the other photovoltaic cell is normally or forwardly biased to commence the generation of voltage immediately upon the impingement thereon of radiant energy from the associated source 146A or 146B. Thus, the circuit arrangement of FIG. 13 according to this invention also avoids the reverse biasing of the inactive photovoltaic cell and the attendant problems that have been described with reference to the previously proposed arrangement of FIG. 10. It should be noted that the voltage $\alpha$ produced by each of the photovoltaic cells 237A and 237B, each of which may be a silicon photodiode, as hereinafter described, is less than so-called "break point," which is 0.6V for silicon, so that the inactive forwardly biased photodiode will not short the voltage produced by the active photodiode.

As shown on FIGS. 11 and 12, in producing an image pickup tube 202 having the circuit arrangement of FIG. 13, a transparent conductive layer, for example, of tin oxide or Nesa, may be deposited on the entire area of one surface of a thin glass plate 203, whereupon, the transparent conductive layer is subjected to photoetching to remove selected portions thereof so that the remaining portions of such conductive layer form the indexing electrodes A and B and the surrounding electrode C (FIG. 11). As shown, each of the electrodes A and B includes elongated, parallel striplike elements 250A or 250B interleaved or alternated with the stripe-like elements of the other indexing electrode. Further, the electrodes A and B include generally C-shaped portions 251A and 251B respectively having generally parallel arms 252A and 253A and arms 252B and 253B, and the stripe-like elements 250A and 250B are integral with, and extend from the arms 252A and 252B of respective C-shaped portions 251A and 251B. It will also be seen that the C-shaped portions 251A and 251B are arranged with arms 252A and 253B adjacent each other and with arms 252B and 253A adjacent each other. Stripes of resistive paint are applied to glass plate 203 between electrodes A and C and between electrodes B and C constitute the resistors $2Ra$ and $2Rb$. The photovoltaic cells 237A and 237B, which are formed apart from plate 203 are applied to the latter, as hereinafter described, so as to extend between arms 252A and 253B and between arms 252B and 253A, respectively.

As shown on FIG. 12 with respect to photovoltaic cell 237A, each of the photovoltaic cells 237A and 237B may be a silicon photovoltaic cell in the form of a photodiode consisting of a P-type region 238 and an N-type region 239 having solder or metallic electrodes 240 and 241, respectively, formed thereon, The electrodes 240 and 241 are connected or bonded to arm 252A or 252B and to arm 253B or 253A, respectively through metallic contact layers 242 and 243, respectively, which are previously applied to at least the corresponding areas of the arms 252A and B and 253A and B, and which may each consist of successive layers of aluminum, silver solder and tin applied by vapor deposition. As before, the photoconductive layer 201 is applied over electrodes A and B and may cover the photovoltaic cells 237A and 237B. Then, the surface of plate 203 facing away from electrodes A,B and C is bonded, as by transparent adhesive, to the glass face plate 204 which has the striped color filter F thereon. Finally, the face plate assembly, constructed as above, is secured on the front end of the tube envelope 205 by means of the conductive ring 235 and an intervening indium seal 236 which extends onto electrode C for electrically connecting the latter with conductive ring 235.

It will be apparent that, in the embodiment of this invention described above with reference to FIGS. 11–13, the voltage differences are established between the indexing electrodes A and B to produce a balanced index signal in the composite output without the provision of terminal pins extending through the faceplate assembly, as at 33 on FIG. 7. Thus, the image pickup tubes according to this invention can be reliably hermetically sealed and the manufacture thereof is simplified.

Although an illustrative embodiment of the invention has been described in detail herein, it is to be understood that the invention is not limited to that precise embodiment and that various changes and modifications may be effected therein by one skilled in the art without departing from the scope or spirit of the invention.

What is claimed is:

1. An image pickup tube comprising a photoconductive layer for the conversion of images projected thereon into an electrical output,, a pair of indexing electrodes disposed in close proximity to said photoconductive layer for electrically forming an index image on said layer to be included as an index signal in said electrical output in response to the application of different voltages to said indexing electrodes, a pair of photovoltaic cells connected in parallel with each other between said indexing electrodes with the polarities of said photovoltaic cells being reversed relative to each other, and radiant energy sources associated with said photovoltaic cells, respectively, and being alternately energized for alternately activating the respective photovoltaic cells and thereby applying said different voltages to said indexing electrodes.

2. An image pickup tube according to claim 1, further comprising a pair of series-connected resistors also connected between said indexing electrodes and providing a junction between said resistors at which said output is derived.

3. An image pickup tube according to claim 2, further comprising means for applying a bias voltage to said junction.

4. An image pickup tube according to claim 1, further comprising filter means for forming a color separated image of an object to be reproduced on said layer so that said electrical output is a composite signal containing a color video signal corresponding to said color separated image in addition to said index signal.

5. An image pickup tube according to claim 4, further comprising circuit means for separating aid color video signal and said index signal from said composite signal, and means controlled by said index signal for separating individual color component signals from said color video signal.

6. An image pickup tube according to claim 4, in which said photoconductive layer, indexing electrodes, photovoltaic cells and filter means are joined together in a unitary structure constituting a faceplate assembly of the image pickup tube.

7. An image pickup tube according to claim 1, in which said photoconductive layer, indexing electrodes and photovoltaic cells are joined together in a unitary structure constituting a faceplate assembly of the image pickup tube.

8. An image pickup tube according to claim 7, in which said radiant energy sources are at the exterior of said faceplate assembly for emitting light rays to energize said photovoltaic cells.

9. An image pickup tube according to claim 8, in which said light rays emitted by said radiant energy sources are within a portion of the spectrum to which said photoconductive layer is insensitive.

10. An image pickup tube according to claim 8, further comprising means producing an electron beam which scans said photoconductive layer with a predetermined scanning period; and in which said indexing electrodes each include a plurality of elongated parallel elements extending at right angles to the direction of scanning of said layer by said beam with said elements of one of said indexing electrodes being interleaved with said elements of the other of said indexing electrodes so that said index signal is represented by an alternating voltage in said output, and said radiant energy sources are alternately energized by circuit means including an alternating signal source synchronized with the scanning pf said beam and connected with said radiant energy sources to cause said photovoltaic cells to alternate said different voltages applied to said indexing electrodes in successive scanning periods and thereby reverse the phase of said index signal in said successive scanning periods.

11. An image pickup tube according to claim 8, in which said radiant energy source includes at least one luminescent diode which, when energized, emits said lights rays.

12. An image pickup tube according to claim 8, further comprising a tube envelope having said faceplate assembly disposed at one end, a conductive ring extending around said end of the tube envelope and around the periphery of said faceplate assembly, an electrically conductive sealing member interposed between said ring and said faceplate assembly and tube envelope for hermetically sealing said end of the tube, and conductive means on said faceplate assembly between said sealing member and said index electrodes for applying a bias voltage to the latter from said conductive ring.

13. An image pickup tube according to claim 12, in which said conductive means further defines a pair of series-connected resistors also connected between said indexing electrodes.

14. An image pickup tube according to claim 13, in which said indexing electrodes are in contact with said photoconductive layer which has a high resistance so that said electrical output is obtained at said conductive ring from between said resistors.

* * * * *